US007882820B2

(12) United States Patent
Irisawa (10) Patent No.: US 7,882,820 B2
(45) Date of Patent: Feb. 8, 2011

(54) CONTROL APPARATUS OF INTERNAL COMBUSTION ENGINE AND CONTROL METHOD OF INTERNAL COMBUSTION ENGINE

(75) Inventor: Yasuyuki Irisawa, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 68 days.

(21) Appl. No.: 12/280,706

(22) PCT Filed: Feb. 26, 2007

(86) PCT No.: PCT/IB2007/000451

§ 371 (c)(1),
(2), (4) Date: Aug. 26, 2008

(87) PCT Pub. No.: WO2007/099426

PCT Pub. Date: Sep. 7, 2007

(65) Prior Publication Data
US 2009/0030589 A1   Jan. 29, 2009

(30) Foreign Application Priority Data
Feb. 28, 2006   (JP)   ............................. 2006-053413

(51) Int. Cl.
*F02B 33/44*   (2006.01)
(52) U.S. Cl. ................................ 123/198 F; 123/559.1; 60/605.1
(58) Field of Classification Search ................... 60/601, 60/603, 611, 601.5, 598; 123/198 F, 559.1–559.3
See application file for complete search history.

(56) References Cited

U.S. PATENT DOCUMENTS

| 4,452,208 | A | * | 6/1984 | Merlini et al. | ............... | 123/481 |
| 4,781,160 | A | * | 11/1988 | Lohr et al. | ............... | 123/198 F |
| 6,158,218 | A | * | 12/2000 | Herold et al. | .................. | 60/609 |
| 6,640,543 | B1 | * | 11/2003 | Seal | ............................ | 60/609 |
| 6,715,289 | B2 | * | 4/2004 | Mader et al. | .................. | 60/612 |

(Continued)

FOREIGN PATENT DOCUMENTS
EP   1 619 368 A1   1/2006

(Continued)

OTHER PUBLICATIONS
Japanese Office Action dated Feb. 3, 2009.

*Primary Examiner*—Thomas Denion
*Assistant Examiner*—Douglas J. Duff
(74) *Attorney, Agent, or Firm*—Finnegan, Henderson, Farabow, Garrett & Dunner, LLP (57) ABSTRACT

A control apparatus of an internal combustion engine in which a plurality of cylinders is divided into a first cylinder group (1a) and a second cylinder group (1b), the internal combustion engine being able to be selectively switched between operating in a partial cylinder operation mode in which only one of the first cylinder group (1a) and the second cylinder group (1b) is operated, and operating in a full cylinder operation mode in which both the first cylinder group (1a) and the second cylinder group (1b) are operated. This control apparatus includes a supercharger (8), as well as a controller (30) that selectively starts and stops operation of the supercharger (8) depending on a load on the internal combustion engine when the internal combustion engine is to be operated in the partial cylinder operation mode.

16 Claims, 11 Drawing Sheets

U.S. PATENT DOCUMENTS

| | | | |
|---|---|---|---|
| 6,786,190 B2 * | 9/2004 | Wu et al. | 123/198 F |
| 6,874,463 B1 * | 4/2005 | Bolander et al. | 123/198 F |
| 7,343,902 B2 * | 3/2008 | Brevick et al. | 123/481 |
| 7,503,312 B2 * | 3/2009 | Surnilla et al. | 123/406.45 |
| 2003/0188535 A1 * | 10/2003 | Mader et al. | 60/612 |

FOREIGN PATENT DOCUMENTS

| | | |
|---|---|---|
| GB | 2 115 873 A | 9/1983 |
| JP | 1-27246 | 4/1985 |
| JP | 61-200339 | 9/1986 |
| JP | 7-133716 | 5/1995 |
| JP | 8-105339 | 4/1996 |
| JP | 9-88665 | 3/1997 |
| JP | 2005-291020 | 10/2005 |

\* cited by examiner

FIG. 12

CONTROL APPARATUS OF INTERNAL COMBUSTION ENGINE AND CONTROL METHOD OF INTERNAL COMBUSTION ENGINE

CROSS-REFERENCE TO RELATED APPLICATIONS

This application is a national phase application of International Application No. PCT/IB2007/000451, filed Feb. 26, 2007, and claims the priority of Japanese Application No. 2006-053413, filed Feb. 28, 2006, the contents of both of which are incorporated herein by reference.

BACKGROUND OF THE INVENTION

1. Field of the Invention

The invention relates to a control apparatus of an internal combustion engine and a control method of an internal combustion engine.

2. Description of the Related Art

An internal combustion engine is known in which a plurality of cylinders of the internal combustion engine are divided into two groups. When the load on the internal combustion engine is less than a value for switching operation modes (hereinafter referred to as "operation mode switching value"), the internal combustion engine operates in a partial cylinder operation mode in which only one of the two cylinder groups is operated. When the load on the internal combustion engine is greater than the operation mode switching value, the internal combustion engine operates in a full cylinder operation mode in which both cylinder groups are operated. Accordingly, fuel consumption is reduced when operating under a low load while greater engine output is able to be ensured when operating under a high load.

Here, in consideration of fuel consumption, it is preferable to set the operation mode switching value as high as possible to increase the operating region in which the internal combustion engine operates in the partial cylinder operation mode as much as possible.

Japanese Patent Application Publication No. JP-A-8-105339 describes a related internal combustion engine. With this related internal combustion engine, when the load on the internal combustion engine is low when the internal combustion engine is to be operated in the partial cylinder operation mode, the internal combustion engine is operated in the partial cylinder operation mode with a lean air-fuel ratio. When the load on the internal combustion engine is high when the internal combustion engine is to be operated in the partial cylinder operation mode, the internal combustion engine is operated in the partial cylinder operation mode with the stoichiometric air-fuel ratio.

However, there is a limit as to just how much fuel consumption can be reduced when the air-fuel ratio is made rich in order to shift it from a lean air-fuel ratio to the stoichiometric air-fuel ratio.

SUMMARY OF THE INVENTION

This invention provides a control apparatus of an internal combustion engine and a control method of an internal combustion engine which reduces fuel consumption by expanding the operating region in which the internal combustion engine is to be operated in the partial cylinder operation mode.

A first aspect of the invention relates to a control apparatus of an internal combustion engine in which a plurality of cylinders is divided into a first cylinder group and a second cylinder group, the internal combustion engine being able to be selectively switched between operating in a partial cylinder operation mode in which only one of the first cylinder group and the second cylinder group is operated, and operating in a full cylinder operation mode in which both the first cylinder group and the second cylinder group are operated. This control apparatus includes a supercharger, as well as a controller that selectively starts and stops operation of the supercharger depending on a load on the internal combustion engine when the internal combustion engine is to be operated in the partial cylinder operation mode.

A second aspect of the invention relates to a control method of an internal combustion engine in which a plurality of cylinders is divided into a first cylinder group and a second cylinder group, the internal combustion engine being able to be selectively switched between operating in a partial cylinder operation mode in which only one of the first cylinder group and the second cylinder group is operated, and operating in a full cylinder operation mode in which both the first cylinder group and the second cylinder group are operated, and being provided with a supercharger. This control method includes the steps of selectively starting and stopping operation of the supercharger depending on a load on the internal combustion engine when the internal combustion engine is to be operated in the partial cylinder operation mode.

This control apparatus and method of an internal combustion engine enable fuel consumption to be reliably reduced by expanding the operating region in which the internal combustion engine is to be operated in the partial cylinder operation mode.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
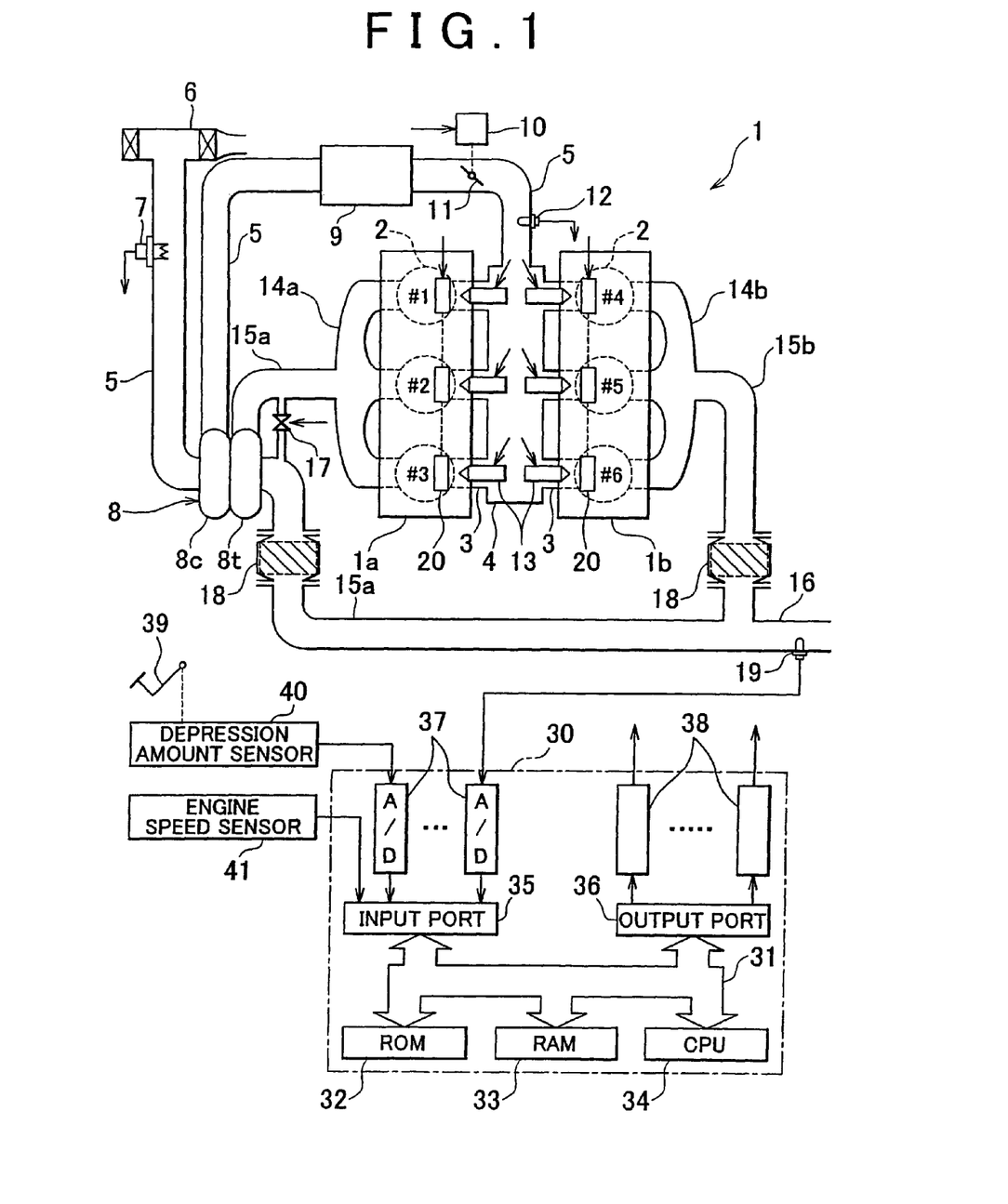
FIG. 1 is an overall view of an internal combustion engine according to a first example embodiment of the invention.

Referring to FIG. 1, an internal combustion engine 1 according to a first example embodiment of the invention has two cylinder groups or banks, i.e., a first cylinder group 1a and a second cylinder group 1b. The first cylinder group 1a includes a first cylinder #1, a second cylinder #2, and a third cylinder #3, and the second cylinder group 1b includes a fourth cylinder #4, a fifth cylinder #5, and a sixth cylinder #6. The firing order in the internal combustion engine shown in FIG. 1 is, for example, #1→#5→#3→#6→#2→#4. In this example embodiment, each cylinder group 1a and 1b includes three cylinders 2, but the invention is not limited to this as long as each cylinder group 1a and 1b includes at least one cylinder.

The cylinders 2 of each cylinder group 1a and 1b are all connected to a common surge tank 4 via intake branch pipes 3 corresponding to each cylinder 2. The surge tank is connected to an air cleaner 6 via an intake duct 5. Inside the intake duct 5 are arranged, in order from the upstream side, an airflow meter 7 for detecting an intake air amount, a compressor 8c of an exhaust turbocharger 8, a cooling apparatus 9 for cooling air that has been supercharged by the compressor 8c, a throttle valve 11 which is driven by an actuator 10, and a pressure sensor 12 for detecting an intake air pressure Pm, i.e., the air pressure inside the intake duct 5 downstream of the throttle valve 11. Also, a fuel injection valve 13 for supplying fuel into the cylinder is mounted in each intake branch pipe 3. An engine driven supercharger may also be used instead of the exhaust turbocharger 8.

Meanwhile, the cylinders 2 of the first cylinder group 1a are connected to a common exhaust pipe 16 via an exhaust manifold 14a and an exhaust pipe 15a, and the cylinders 2 of the second cylinder group 1b are connected to the common exhaust pipe 16 via an exhaust manifold 14b and an exhaust pipe 15b. In the example embodiment shown in FIG. 1, a turbine 8t of the exhaust turbocharger 8 is arranged in the exhaust pipe 15a while no turbine is arranged in the exhaust pipe 15b. The exhaust pipe 15a upstream and downstream of this turbine 8t is connected together via an electrically driven waste gate valve 17 which is normally closed. Also, a small capacity catalyst 18 is also arranged in both exhaust pipes 15a and 15b. An air-fuel ratio sensor 19 for detecting an air-fuel ratio, as well as a large capacity catalyst, not shown, is arranged in the common exhaust pipe 16.

Referring closer to FIG. 1, a variable valve driving mechanism 20 for controlling the opening and closing operations of one or both of an intake valve and an exhaust valve is provided in each cylinder 2. This variable valve driving mechanism 20 will be described in more detail later, but in this example embodiment it selectively switches the internal combustion engine between a partial cylinder operation mode in which only one of the two cylinder groups, i.e., either the first cylinder group 1a or the second cylinder group 1b, is operated while the other cylinder group is stopped, and a full cylinder operation mode in which both cylinder groups are operated. When the internal combustion engine is to be operated in the partial cylinder operation mode, the variable valve driving mechanism 20 keeps one or both of the intake valve and the exhaust valve of the cylinders in the cylinder group that is stopped closed.

An electronic control unit 30 is formed of a digital computer and includes ROM (read only memory) 32, RAM (random access memory) 33, a CPU (microprocessor) 34, an input port 35, and an output port 36, all of which are connected together by a bidirectional bus 31. The input port 35 receives output voltages from the airflow meter 7, the pressure sensor 12, and the air-fuel ratio sensor 19 via corresponding A/D converters 37. Also, a depression amount sensor 40 which produces an output voltage proportional to a depression amount of an accelerator pedal 39 is connected to the accelerator pedal 39. The input port 35 receives this output voltage from the depression amount sensor 40 via a corresponding A/D converter 37. Moreover, an engine speed sensor 41 that generates an output pulse indicative of the engine speed NE is connected to the input port 35. The output port 36 is connected to the actuator 10, the fuel injection valve 13, the waste gate valve 17, and the variable valve driving mechanism 20 via corresponding drive circuits 38.

Figure 2:
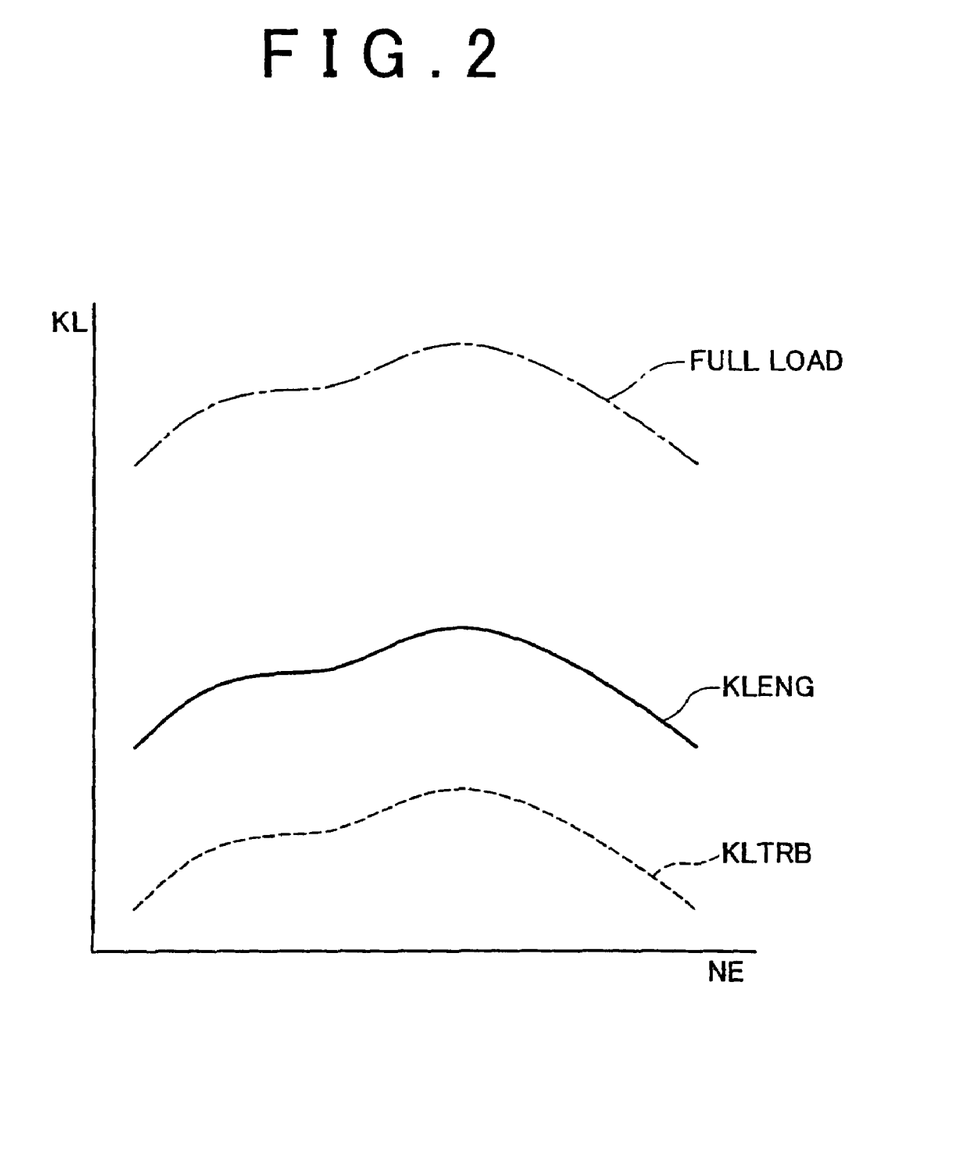
FIG. 2 is a line diagram showing an operation mode switching value and a supercharging on-off switching value according to the first example embodiment.

In this example embodiment, the internal combustion engine is selectively switched between the partial cylinder operation mode and the full cylinder operation mode depending on the load on the internal combustion engine. That is, as shown in FIG. 2, when an engine load ratio KL indicative of the ratio of the load on the internal combustion engine to a full load is less than an operation mode switching value KLENG that was set in advance, only one of the cylinder groups, i.e., either the first cylinder group 1a or the second cylinder group 1b, is operated and the other group is stopped. On the other hand, when the engine load ratio KL is greater than the operation mode switching value KLENG, both the first cylinder group 1a and the second cylinder group 1b are operated. As a result, fuel consumption is able to be reduced when the internal combustion engine is operating at a low load while greater engine power is able to be ensured when the internal combustion engine is operating at a high load. In this example embodiment, combustion is performed with a lean air-fuel ratio both when the internal combustion engine is operating in the partial cylinder operation mode and in the full cylinder operation mode.

As described above, making the operating region in which the internal combustion engine is to be operated in the partial cylinder operation mode as large as possible enables a greater reduction in fuel consumption. On the other hand, driving the exhaust turbocharger 8 to perform supercharging enables the engine output to be increased even when the internal combustion engine is operating in the partial cylinder operation mode.

Therefore, in this example embodiment, as shown in FIG. 2, when the engine load ratio KL is less than a preset supercharging on-off switching value KLTRB (KLTRB<KLENG), the internal combustion engine is operated in the partial cylinder operation mode with natural aspiration, and when the engine load ratio KL is greater than the supercharging on-off switching value KLTRB but less than the operation mode switching value KLENG, the internal combustion engine is operated in the partial cylinder operation mode with supercharging. As a result, the operating switching value KLENG can be set high so that the operating region in which the internal combustion engine is to be operated in the partial cylinder operation mode can be expanded. The operation mode switching value KLENG and the supercharging on-off switching value KLTRB are stored in advance in the ROM 32 as functions, for example, with the engine speed NE and the engine load ratio KL as parameters.

Supercharging is performed by the turbine 8 being driven by exhaust gas flowing into the turbine 8t of the exhaust turbocharger 8 from the first cylinder group 1a when that cylinder group is operated. Therefore, when only the second cylinder group 1b is operated, supercharging will not be performed because the exhaust gas from the second cylinder group 1b does not flow into the turbine 8t.

For this reason, we will refer to the first cylinder group 1a as the supercharged cylinder group and the second cylinder group 1b as the naturally aspirated cylinder group. Thus, when the internal combustion engine 1 according to this example embodiment is to be operated in the partial cylinder operation mode with natural aspiration, the naturally aspirated cylinder group 1b is operated and the supercharged cylinder group 1a is stopped. On the other hand, when the internal combustion engine 1 according to this example embodiment is to be operated in the partial cylinder operation mode with supercharging, the supercharged cylinder group 1a is operated and the naturally aspirated cylinder group 1b is stopped.

Figure 3:
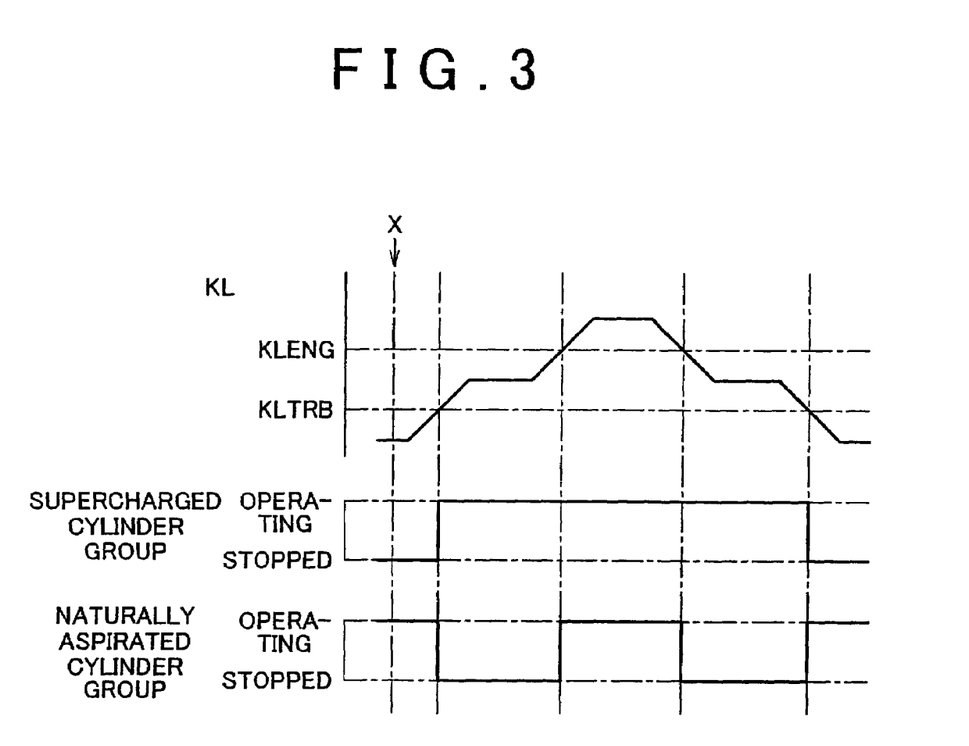
FIG. 3 is a time chart illustrating control according to the first example embodiment.

That is, when the engine load ratio KL is less than the supercharging on-off switching value KLTRB, the naturally aspirated cylinder group 1b is operated and the supercharged cylinder group 1a is stopped, as shown by arrow X in FIG. 3. Then when the engine load radio KL exceeds the supercharging on-off switching value KLTRB, the naturally aspirated cylinder group 1b is stopped and the supercharged cylinder group 1a is operated. Then when the engine load ratio KL exceeds the operation mode switching value KLENG, both the supercharged cylinder group 1a and the naturally aspirated cylinder group 1b are operated. After that when the engine load ratio KL becomes less than the operation mode switching value KLENG, only the supercharged cylinder group 1a is operated, and after that when the engine load ratio KL becomes less than the supercharging on-off switching value KLTRB, only the naturally aspirated cylinder group 1b is operated.

Supercharging can be stopped even if the supercharged cylinder group 1a is operating by fully opening the waste gate valve 17, at which time the supercharged cylinder group 1a will operate with natural aspiration. Therefore, when the internal combustion engine 1 is to be operated in the partial cylinder operation mode with natural operation, it is also possible to operate only the supercharged cylinder group 1a while keeping the waste gate valve 17 fully open. However, with naturally aspirated operation, the compression ratio, for example, can be higher than it is with supercharged operation so the structure of the cylinder group suited for supercharged operation differs from the structure of the cylinder group suited for naturally aspirated operation. Therefore, in this example embodiment, the supercharged cylinder group 1a is formed of a cylinder group suited for supercharged operation while the naturally aspirated cylinder group 1b is formed of a cylinder group suited for naturally aspirated operation. Thus, when the internal combustion engine 1 is to be operated in the partial cylinder operation mode with supercharging, only the supercharged cylinder group 1a is operated, and when the internal combustion engine 1 is to be operated in the partial cylinder operation mode with natural aspiration, only the naturally aspirated cylinder group 1b is operated.

Supercharging may be stopped when all of the cylinders are operating but in this example embodiment, supercharging is also performed when all of the cylinders are operating. As a result, the dimensions or displacement of the engine 1 itself, i.e., the two cylinder groups 1a and 1b, can be less than they can in an internal combustion engine according to the related art described above in which all of the cylinders operate with natural aspiration. When the internal combustion engine 1 is operated in the partial cylinder operation mode with the naturally aspirated cylinder group 1b, fuel consumption can be reduced much more than it can be with the internal combustion engine according to the related art described above by reducing the number of working cylinders and reducing the dimensions of the naturally aspirated cylinder group 1b.

Figure 4:
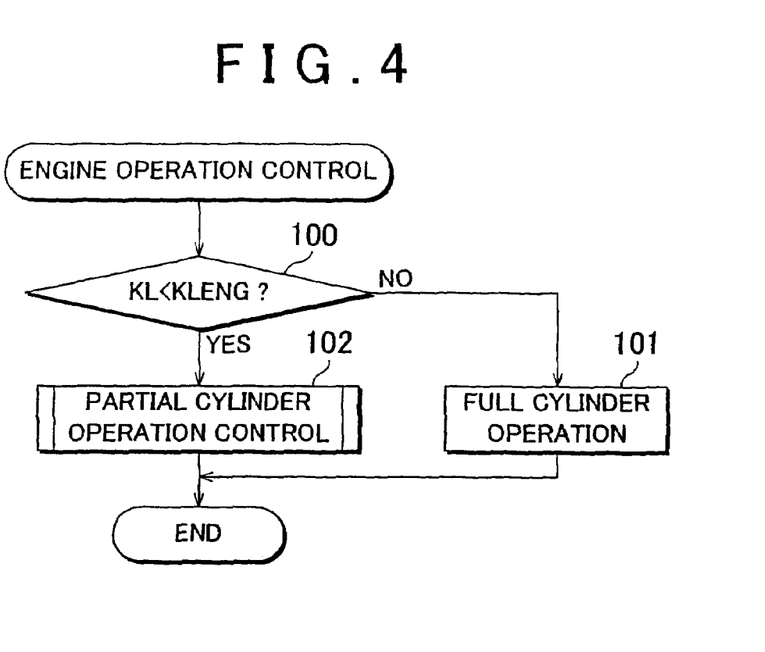
FIG. 4 is a flowchart illustrating an engine operating control routine according to the first example embodiment.

FIG. 4 is an engine operation control routine according to this example embodiment.

Referring to FIG. 4, it is first determined in step 100 whether the engine load ratio KL is less than the operation mode switching value KLENG. If the engine load ratio KL is equal to or greater than the operation mode switching value KLENG, the process proceeds on to step 101 where all of the cylinders are operated. If, on the other hand, the engine load ratio KL is less than the operation mode switching value KLENG, the process proceeds to step 102 where a partial cylinder operation control routine is executed. This partial cylinder operation control routine is shown in FIG. 5.

Figure 5:
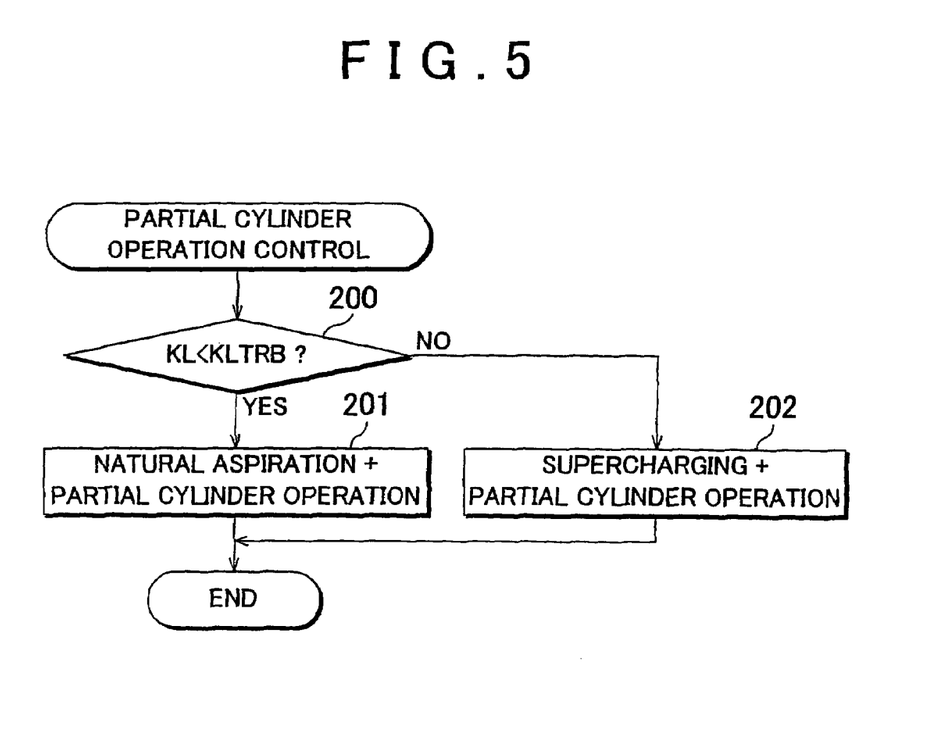
FIG. 5 is a flowchart illustrating a partial cylinder operation control routine according to the first example embodiment.

Referring to FIG. 5, it is first determined in step 200 whether the engine load ratio KL is less than the supercharging on-off switching value KLTRB. If the engine load ratio KL is less than the supercharging on-off switching value KLTRB, the process proceeds on to step 201 where only the naturally aspirated cylinder group 1b is operated. If, on the other hand, the engine load ratio KL is equal to or greater than the supercharging on-off switching value KLTRB, then the process proceeds on to step 202 where only the supercharged cylinder group 1a is operated.

Figure 6:
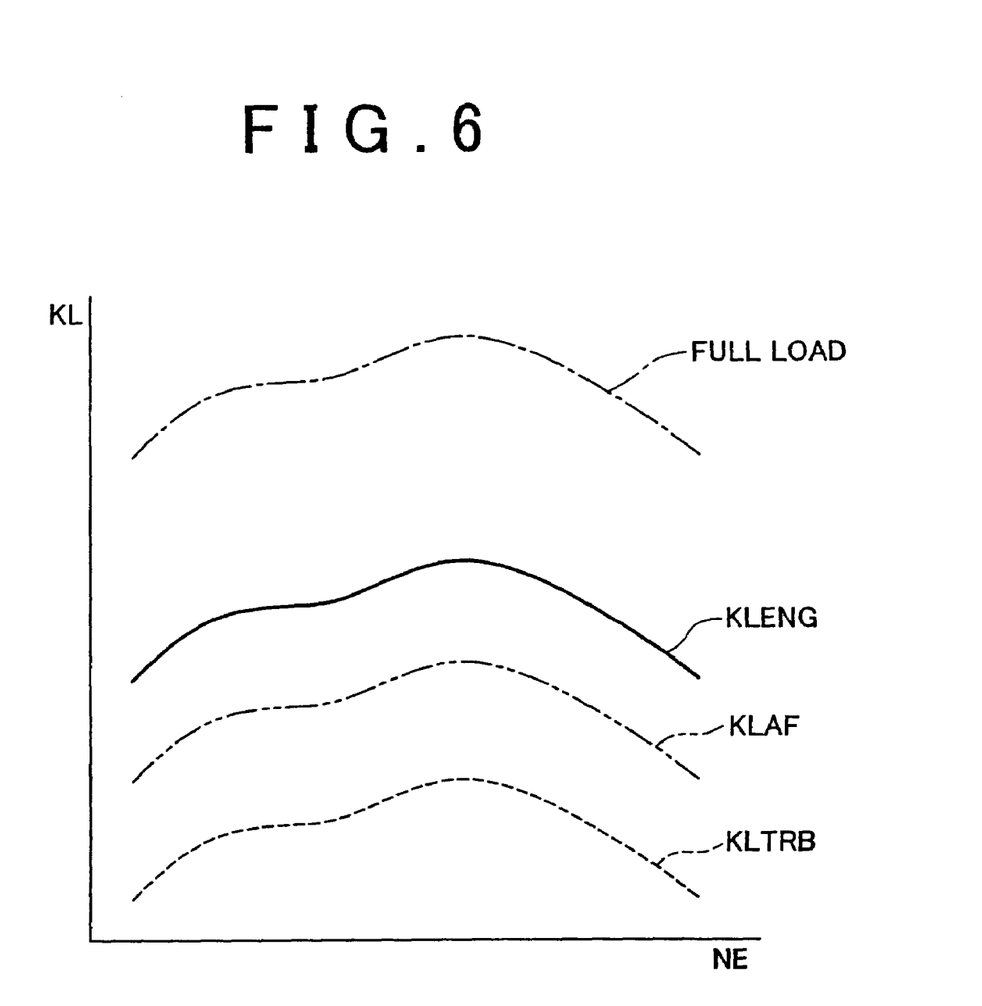
FIG. 6 is a line diagram showing an operation mode switching value, a supercharging on-off switching value, and an air-fuel ratio switching value according to a second example embodiment of the invention.

Next, a second example embodiment of the invention will be described with reference to FIGS. 6 and 7.

In the first example embodiment described above, the air-fuel ratio of the supercharged cylinder group 1a is set to be lean when the internal combustion engine 1 is operated in the partial cylinder operation mode with supercharging. However, setting the air-fuel ratio at this time to an air-fuel ratio that is richer than this lean air-fuel ratio, such as the stoichiometric air-fuel ratio, enables engine output to be increased. Accordingly, the operating region in which the internal combustion engine 1 is operated in the partial cylinder operation mode can be expanded.

Therefore, in this second example embodiment, the air-fuel ratio is controlled according to the engine load when the internal combustion engine 1 is to be operated in the partial cylinder operation mode with supercharging. More specifically, as shown in FIG. 6, when the internal combustion engine 1 is to be operated in the partial cylinder operation mode with supercharging and the engine load ratio KL is less than a preset air-fuel ratio switching value KLAF (KLTRB<KLAF<KLENG), only the supercharged cylinder group 1a is operated, with the air-fuel ratio being lean. On the other hand, when the internal combustion engine 1 is to be operated in the partial cylinder operation mode with supercharging and the engine load ratio KL is greater the air-fuel ratio switching value KLAF, only the supercharged cylinder group 1a is operated, with the air-fuel ratio being the stoichiometric air-fuel ratio. The air-fuel ratio switching value KLAF is stored in advance in the ROM 32 as, for example, a function of the engine speed NE.

Figure 7:
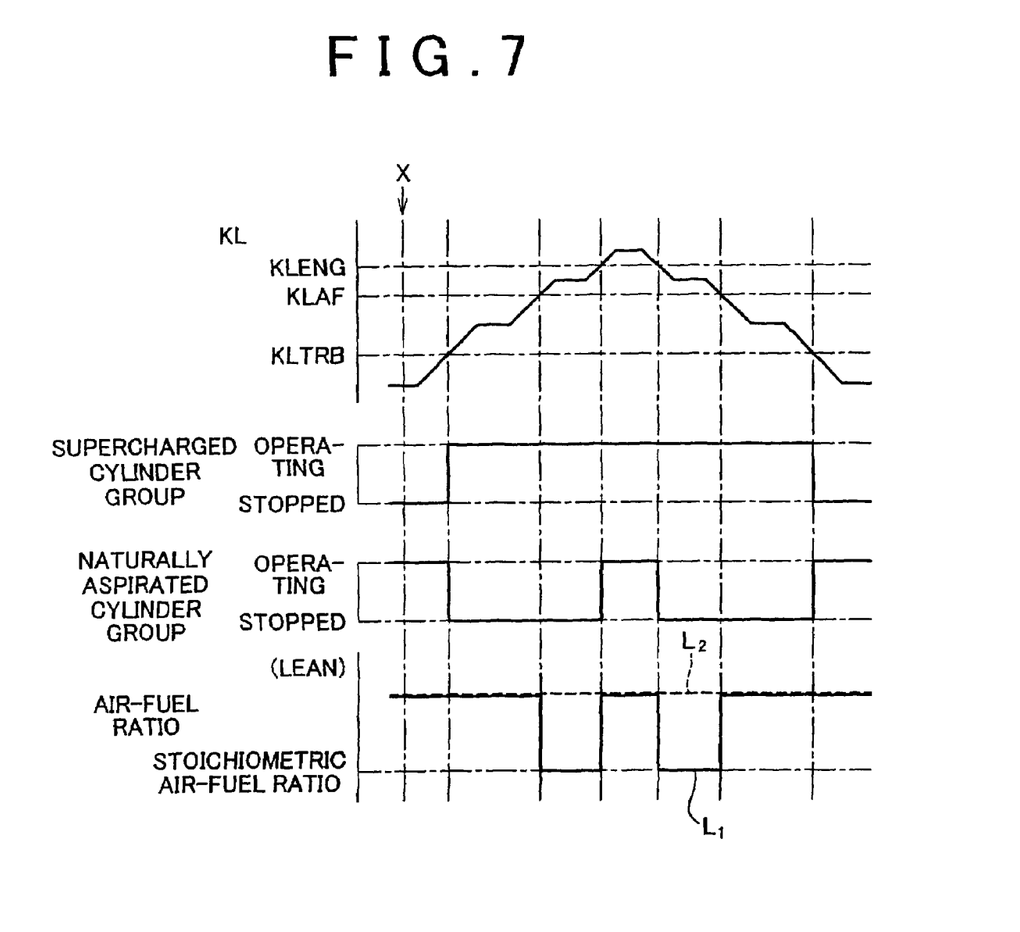
FIG. 7 is a time chart illustrating control according to the second example embodiment.

That is, in this second example embodiment, when the engine load ratio KL is less than the supercharging on-off switching value KLTRB, the naturally aspirated cylinder group 1b is operated with a lean air-fuel ratio and the supercharged cylinder group 1a is stopped, as shown by arrow X in FIG. 7. In FIG. 7, the air-fuel ratio of the supercharged cylinder group 1a is indicated by the solid line $L_1$ and the air-fuel ratio of the naturally aspirated cylinder group 1b is indicated by the broken line $L_2$. When the engine load ratio KL exceeds the supercharging on-off switching value KLTRB after that, the naturally aspirated cylinder group 1b stops and the supercharged cylinder group 1a starts to be operated with a lean air-fuel ratio. When the engine load ratio KL exceeds the air-fuel ratio switching value KLAF after that, the air-fuel ratio of the supercharged cylinder group 1a switches from lean to stoichiometric. Then when the engine load ratio KL exceeds the operation mode switching value KLENG after that, the supercharged cylinder group 1a is operated with a lean air-fuel ratio and the naturally aspirated cylinder group 1b is also operated with a lean air-fuel ratio. Then when the engine load ratio KL falls below the operation mode switching value KLENG, only the supercharged cylinder group 1a is operated, with the air-fuel ratio being the stoichiometric air-fuel ratio, and then when the engine load ratio KL falls below the air-fuel ratio switching value KLAF, the air-fuel ratio of the supercharged cylinder group 1a switches from stoichiometric to lean. When the engine load ratio KL falls below the supercharging on-off switching value KLTRB after that, only the naturally aspirated cylinder group 1b is operated.

Figure 8:
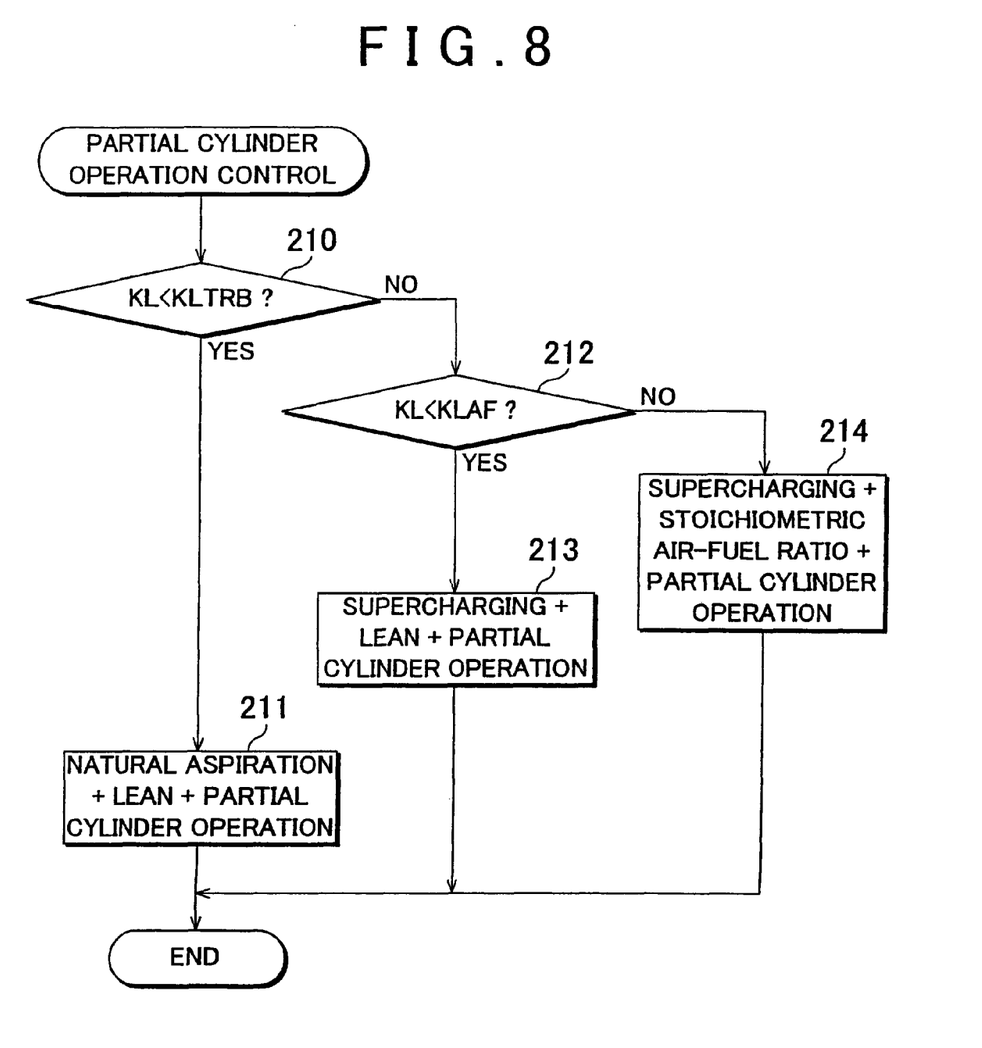
FIG. 8 is a flowchart illustrating a partial cylinder operation control routine according to the second example embodiment.

FIG. 8 is a flowchart of a partial cylinder operation control routine according to the second example embodiment. This partial cylinder operation control routine is executed in step 102 of the engine operation control routine in FIG. 4.

Referring to FIG. 8, it is first determined in step 210 whether the engine load ratio KL is less than the supercharging on-off switching value KLTRB. If the engine load ratio KL is less than the supercharging on-off switching value KLTRB, the process proceeds on to step 211 where only the naturally aspirated cylinder group 1b is operated, with the air-fuel ratio being lean. If, on the other hand, the engine load ratio KL is equal to or greater than the supercharging on-off switching value KLTRB, the process proceeds on to step 212 where it is determined whether the engine load ratio KL is less than the air-fuel switching value KLAF. If the engine load ratio KL is less than the air-fuel switching value KLAF, the process proceeds on to step 213 where only the supercharged cylinder group 1a is operated, with the air-fuel ratio being lean. If, on the other hand, the engine load ratio KL is equal to or greater than the air-fuel switching value KLAF, the process proceeds on to step 214 where only the supercharged cylinder group 1a is operated, with the air-fuel ratio being the stoichiometric air-fuel ratio.

Whereas only the naturally aspirated cylinder group 1b is operated with a lean air-fuel ratio when the engine load ratio KL is less than the supercharging on-off switching value KLTRB, it is also possible to have only the naturally aspirated cylinder group 1b operate with the stoichiometric air-fuel ratio when the engine load ratio KL is greater than the supercharging on-off switching value KLTRB. However, making the air-fuel ratio of the supercharged cylinder group 1a lean and operating the supercharged cylinder group 1a enables fuel consumption to be reduced, and performing supercharging enables greater engine output to be obtained.

Next, a third example embodiment of the invention will be described with reference to FIG. 9.

In the two example embodiments described above, the supercharged cylinder group 1a starts to be operated to initiate supercharging when the engine load ratio KL becomes greater than the supercharging on-off switching value KLTRB. When the engine load ratio KL falls below the supercharging on-off switching value KLTRB, the supercharged cylinder group 1a is stopped to stop supercharging. However, even if the supercharged cylinder group 1a is started or stopped, supercharging does not start or stop immediately because of the inertia of the exhaust turbocharger 8. As a result, engine output may be insufficient immediately after switching to operating only the supercharged cylinder group 1a, or engine output may be excessive immediately after switching to operating only the naturally aspirated cylinder group 1b.

Therefore, in this third example embodiment, when switching from operating only the naturally aspirated cylinder group 1b to operating only the supercharged cylinder group 1a, the supercharged cylinder group 1a is first started so that the exhaust turbocharger 8 starts to operate while the naturally aspirated cylinder group 1b continues to operate. Then the naturally aspirated cylinder group 1b is stopped so that only the supercharged cylinder group 1a is operating. This process makes it possible to avoid engine output from becoming insufficient immediately after the switch is made to operate only the supercharged cylinder group 1a. Also, when switching from operating only the supercharged cylinder group 1a to operating only the naturally aspirated cylinder group 1b, the exhaust turbocharger 8 is first stopped while the supercharged cylinder group 1a continues to operate. After the exhaust turbocharger 8 has stopped, the switch is made to operate only the naturally aspirated cylinder group 1b.

Figure 9:
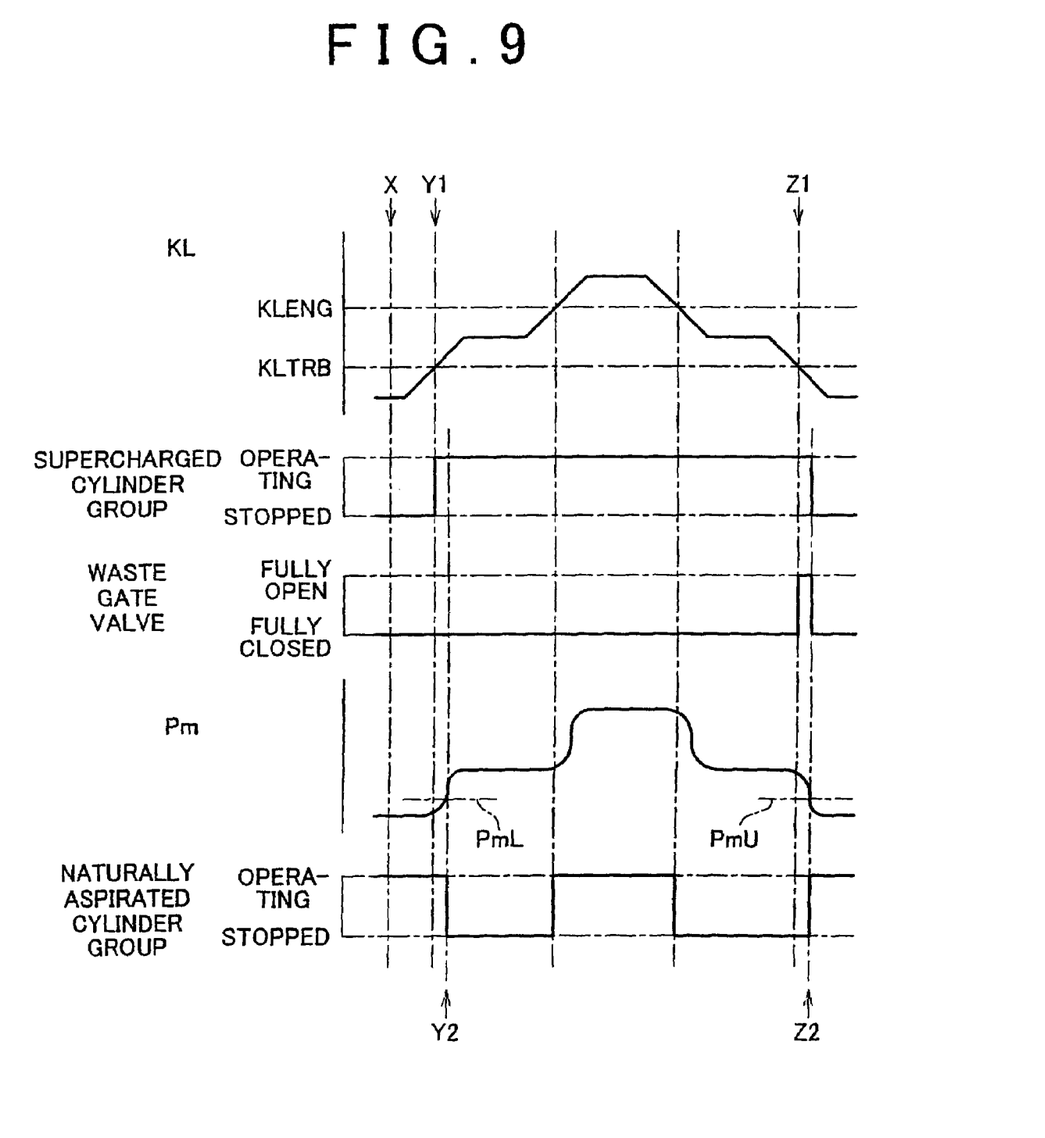
FIG. 9 is a time chart illustrating control according to a third example embodiment.

That is, when the engine load ratio KL becomes greater than the supercharging on-off switching value KLTRB, the supercharged cylinder group 1a starts to operate while the naturally aspirated cylinder group 1b continues to operate such that all of the cylinders are operating, as shown by arrow Y1 in FIG. 9. When the supercharged cylinder group 1a starts to operate, the exhaust turbocharger 8 also starts to operate so the boost pressure or intake pressure Pm gradually rises. Then when the boost pressure Pm becomes higher than an allowable lower limit value PmL, the naturally aspirated cylinder group 1b stops operating such that only the supercharged cylinder group 1a is operating, as shown by arrow Y2 in FIG. 9. As a result, partial cylinder operation can be ensured with sufficient supercharging.

On the other hand, when the engine load ratio KL becomes lower than the supercharging on-off switching value KLTRB, the waste gate valve 17 fully opens while the supercharged cylinder group 1a continues to operate, as shown by arrow Z1 in FIG. 9. As a result, boost pressure Pm gradually drops. Then when the boost pressure Pm drops below an allowable upper limit value PmU, the supercharged cylinder group 1a stops operating and the naturally aspirated cylinder group 1b starts operating, as shown by arrow Z2 in FIG. 9. As a result, excessive engine output can be avoided.

Figure 10:
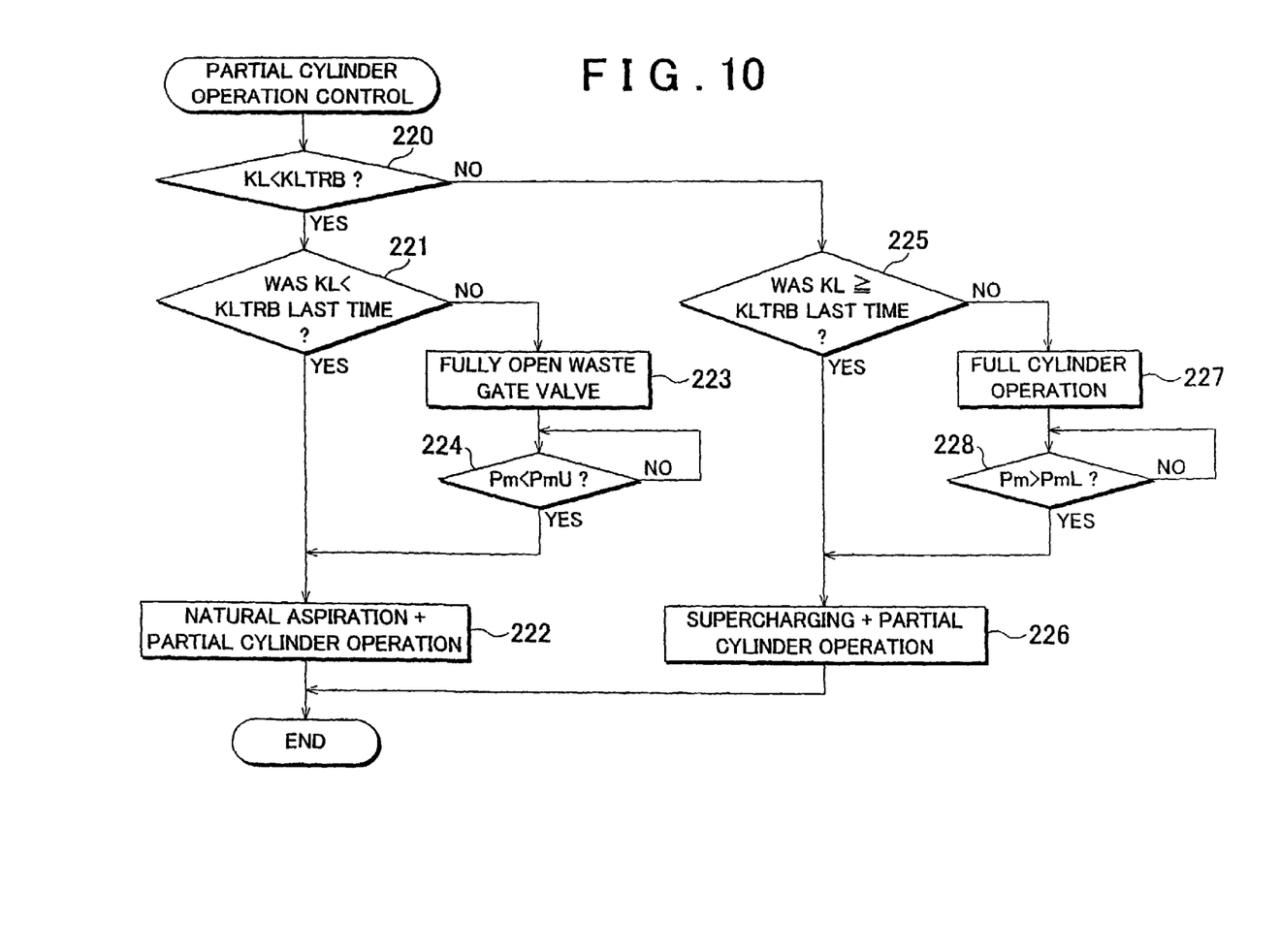
FIG. 10 is a flowchart illustrating a partial cylinder operation control routine according to the third example embodiment.

FIG. 10 is a flowchart of a partial cylinder operation control routine according to the third example embodiment. This partial cylinder operation control routine is executed in step 102 of the engine operation control routine in FIG. 4.

Referring to FIG. 10, it is first determined whether the engine load ratio KL is less than the supercharging on-off switching value KLTRB. If the engine load ratio KL is less than the supercharging on-off switching value KLTRB, the process proceeds on to step 221 where it is determined whether engine load ratio KL was less than the supercharging on-off switching value KLTRB in the last cycle too. If the engine load ratio KL was less than the supercharging on-off switching value KLTRB in the last cycle too, the process proceeds on to step 222 where operation of only the naturally aspirated cylinder group 1b is continued. If, on the other hand, the engine load ratio KL was equal to or greater than the supercharging on-off switching value KLTRB in the last cycle, i.e., if a switch should be made from partial cylinder operation with supercharging to partial cylinder operation with natural aspiration, the process proceeds on to step 223 where the waste gate valve 17 is fully opened. Then in step 224 it is determined whether the boost pressure Pm is less than the allowable upper limit value PmU. If the boost pressure Pm is equal to or greater than the allowable upper limit value PmU, step 224 is repeated. If, on the other hand, the boost pressure Pm is less than the allowable upper limit value PmU, the process proceeds on to step 222 where only the naturally aspirated cylinder group 1b is operated.

If in step 220 the engine load ratio KL is equal to or greater than the supercharging on-off switching value KLTRB, the process proceeds on to step 225 where it is determined whether the engine load ratio KL was equal to or greater than the supercharging on-off switching value KLTRB in the last cycle too. If the engine load ratio KL was equal to or greater than the supercharging on-off switching value KLTRB in the last cycle too, the process proceeds on to step 226 where only operation of the supercharged cylinder group 1*a* is continued. If, on the other hand, the engine load ratio KL was less than the supercharging on-off switching value KLTRB in the last cycle, i.e., if a switch should be made from partial cylinder operation with natural aspiration to partial cylinder operation with supercharging, the process proceeds on to step 227 where all of the cylinders are operated. Then in step 228 it is determined whether the boost pressure Pm is greater than the allowable lower limit value PmL. If the boost pressure Pm is equal to or less than the allowable lower limit value PmL, step 228 is repeated. If, on the other hand, the boost pressure Pm is greater than the allowable lower limit value PmL, the process proceeds on to step 226 where only the supercharged cylinder group 1*a* is operated.

Figure 11:
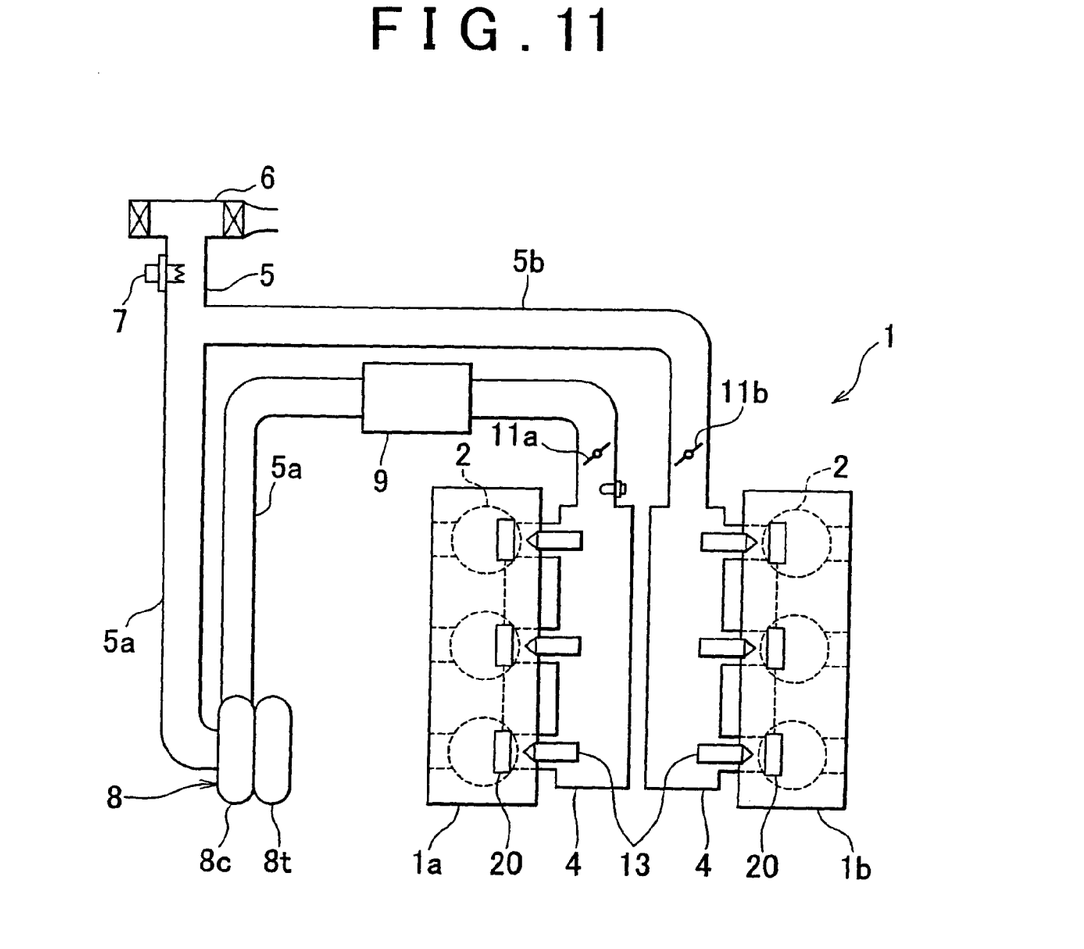
FIG. 11 is a view of a modified example of an intake system of the internal combustion engine according to the first, second, and third example embodiments of the invention.
Figure 12:
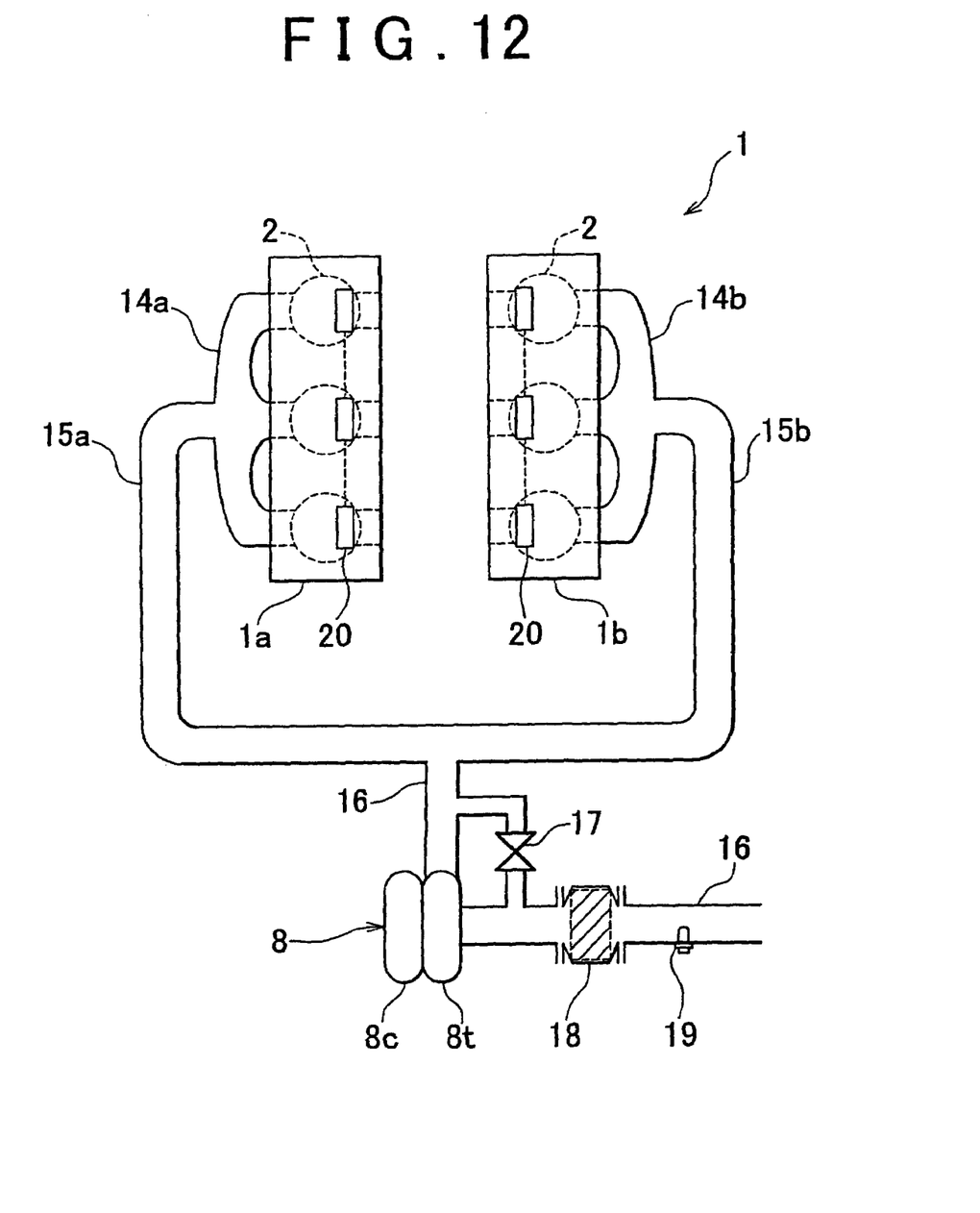
FIG. 12 is a view of a modified example of an exhaust system of the internal combustion engine according to the first, second, and third example embodiments of the invention.

FIG. 11 shows a modified example of an intake system of the internal combustion engine according to the first, second, and third example embodiments of the invention, and FIG. 12 shows a modified example of an exhaust system of the internal combustion engine according to the first, second, and third example embodiments of the invention.

In the example shown in FIG. 1, the common intake duct 5 is provided for the pair of cylinder groups 1*a* and *l* b, and the compressor 8*c* for the exhaust turbocharger 8 is provided in this intake duct 5. However, as shown in FIG. 11, a pair of intake air introduction pipes 5*a* and 5*b* can be provided which branch off from the common intake duct 5. These intake air introduction pipes 5*a* and 5*b* can be connected to the supercharged cylinder group 1*a* and the naturally aspirated cylinder group 1*b*, respectively, via corresponding surge tanks, and the compressor 8*c* can arranged only in the intake air introduction pipe 5*a*. This configuration makes it possible to avoid a rise in intake pressure when a switch is made from operating only the supercharged cylinder group 1*a* to operating only the naturally aspirated cylinder group 1*b*. Also, in the example shown in FIG. 1, the turbine 8*t* of the exhaust turbocharger 8 is arranged in the exhaust pipe 15*a* which is connected to the supercharged cylinder group 1*a*. However, the turbine 8*t* may also be arranged in a common exhaust pipe 16, as shown in FIG. 12. In this case, the waste gate valve 17 is fully opened when the internal combustion engine 1 is to be operated in the partial cylinder operation mode with natural aspiration.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A control apparatus of an internal combustion engine in which a plurality of cylinders is divided into a first cylinder group and a second cylinder group, comprising:
    a supercharger that is formed of an exhaust driven supercharger, and a turbine of the exhaust driven supercharger is provided only in an exhaust passage of the first cylinder group; and
    a controller that selectively switches the internal combustion engine between operating in a partial cylinder operation mode in which only one of the first cylinder group and the second cylinder group is operated, and operating in a full cylinder operation mode in which both the first cylinder group and the second cylinder group are operated, as well as selectively starts and stops operation of the supercharger depending on a load on the internal combustion engine when the internal combustion engine is to be operated in the partial cylinder operation mode, wherein:
    the controller operates only the first cylinder group when the internal combustion engine is to be operated in the partial cylinder operation mode with supercharging;
    the controller operates only the second cylinder group when the internal combustion engine is to be operated in the partial cylinder operation mode with natural aspiration; and
    the controller controls an air-fuel ratio of the first cylinder group according to the load on the internal combustion engine when the internal combustion engine is to be operated in the partial cylinder operation mode with supercharging.

2. The control apparatus according to claim 1, wherein the controller stops the operation of the supercharger and operates the internal combustion engine in the partial cylinder operation mode with natural aspiration when the internal combustion engine is to be operated in the partial cylinder operation mode and the load on the internal combustion engine is less than a predetermined supercharging on-off switching value, and starts the operation of the supercharger and operates the internal combustion engine in the partial cylinder operation mode with supercharging when the internal combustion engine is to be operated in the partial cylinder operation mode and the load on the internal combustion engine is equal to or greater than the predetermined supercharging on-off switching value.

3. The control apparatus according to claim 2, wherein the controller operates the internal combustion engine in the partial cylinder operation mode with a lean air-fuel ratio when the internal combustion engine is to be operated in the partial cylinder operation mode with supercharging and the load on the internal combustion engine is less than a predetermined air-fuel ratio switching value, and operates the internal combustion engine in the partial cylinder operation mode with a richer air-fuel ratio than the lean air-fuel ratio when the internal combustion engine is to be operated in the partial cylinder operation mode with supercharging and the load on the internal combustion engine is equal to or greater than the predetermined air-fuel ratio switching value.

4. The control apparatus according to claim 1, wherein the controller operates the internal combustion engine in the partial cylinder operation mode with a lean air-fuel ratio when the internal combustion engine is to be operated in the partial cylinder operation mode with natural aspiration.

5. The control apparatus according to claim 3, wherein the controller operates the internal combustion engine in the partial cylinder operation mode with a lean air-fuel ratio when the internal combustion engine is to be operated in the partial cylinder operation mode with natural aspiration.

6. The control apparatus according to claim 1, wherein when the controller switches from operating the internal combustion engine in the partial cylinder operation mode with natural aspiration to operating the internal combustion engine in the partial cylinder operation mode with supercharging, the controller first switches to the full cylinder operation mode while starting the supercharger, and then switches to the partial cylinder operation mode with supercharging.

7. The control apparatus according to claim 1, wherein the internal combustion engine is provided with a common intake passage for the first cylinder group and the second cylinder group; a compressor of the supercharger is provided in the common intake passage; and when switching from the partial cylinder operation mode with supercharging to the partial cylinder operation mode with natural aspiration, the controller first stops operation of the supercharger while continuing to operate only the first cylinder group, and after stopping operation of the supercharger, switches to operating only the second cylinder group.

8. The control apparatus according to claim 6, wherein the controller starts to operate the internal combustion engine in the partial cylinder operation mode with supercharging after a boost pressure of the supercharger exceeds a predetermined value.

9. The control apparatus according to claim 1, wherein a compressor of the supercharger is provided only in an intake passage of the first cylinder group.

10. A control method of an internal combustion engine in which a plurality of cylinders is divided into a first cylinder group and a second cylinder group, the internal combustion engine being able to be selectively switched between operating in a partial cylinder operation mode in which only one of the first cylinder group and the second cylinder group is operated, and operating in a full cylinder operation mode in which both the first cylinder group and the second cylinder group are operated, and being provided with a supercharger formed of an exhaust driven supercharger having a turbine provided only in an exhaust passage of said first cylinder group, the control method comprising:

selectively starting and stopping operation of the supercharger depending on a load on the internal combustion engine when the internal combustion engine is to be operated in the partial cylinder operation mode, only the first cylinder group being operated when the internal combustion engine is to be operated in the partial cylinder operation mode with supercharging and only the second cylinder group being operated when the internal combustion engine is to be operated in the partial cylinder operation mode with natural aspiration, wherein an air-fuel ratio of one of the first cylinder group and the second cylinder group is controlled according to the load on the internal combustion engine when the internal combustion engine is to be operated in the partial cylinder operation mode with supercharging.

11. The control method according to claim 10, wherein the operation of the supercharger is stopped and the internal combustion engine is operated in the partial cylinder operation mode with natural aspiration when the internal combustion engine is to be operated in the partial cylinder operation mode and the load on the internal combustion engine is less than a predetermined supercharging on-off switching value, and the operation of the supercharger is started and the internal combustion engine is operated in the partial cylinder operation mode with supercharging when the internal combustion engine is to be operated in the partial cylinder operation mode and the load on the internal combustion engine is equal to or greater than the predetermined supercharging on-off switching value.

12. The control method according to claim 11, wherein the internal combustion engine is operated in the partial cylinder operation mode with a lean air-fuel ratio when the internal combustion engine is to be operated in the partial cylinder operation mode with supercharging and the load on the internal combustion engine is less than a predetermined air-fuel ratio switching value, and the internal combustion engine is operated in the partial cylinder operation mode with a richer air-fuel ratio than the lean air-fuel ratio when the internal combustion engine is to be operated in the partial cylinder operation mode with supercharging and the load on the internal combustion engine is equal to or greater than the predetermined air-fuel ratio switching value.

13. The control method according to claim 10, wherein when a switch is made from operating the internal combustion engine in the partial cylinder operation mode with natural aspiration to operating the internal combustion engine in the partial cylinder operation mode with supercharging, a switch is first made to the full cylinder operation mode while the operation of the supercharger is started, and then a switch is made to the partial cylinder operation mode with supercharging.

14. The control method according to claim 13, wherein the internal combustion engine starts to be operated in the partial cylinder operation mode with supercharging after a boost pressure of the supercharger exceeds a predetermined value.

15. A control apparatus of an internal combustion engine in which a plurality of cylinders is divided into a first cylinder group and a second cylinder group, comprising:

a supercharger that is formed of an exhaust driven supercharger, and a turbine of the exhaust driven supercharger is provided only in an exhaust passage of the first cylinder group;

a common intake passage for the first cylinder group and the second cylinder group; and a controller that selectively switches the internal combustion engine between operating in a partial cylinder operation mode in which only one of the first cylinder group and the second cylinder group is operated, and operating in a full cylinder operation mode in which both the first cylinder group and the second cylinder group are operated, as well as selectively starts and stops operation of the supercharger depending on a load on the internal combustion engine when the internal combustion engine is to be operated in the partial cylinder operation mode, wherein:

the controller operates only the first cylinder group when the internal combustion engine is to be operated in the partial cylinder operation mode with supercharging; and the controller operates only the second cylinder group when the internal combustion engine is to be operated in the partial cylinder operation mode with natural aspiration.

16. A control apparatus of an internal combustion engine in which a plurality of cylinders is divided into a first cylinder group and a second cylinder group, comprising:

a supercharger that is formed of an exhaust driven supercharger, and a turbine of the exhaust driven supercharger is provided only in an exhaust passage of the first cylinder group; and a controller that selectively switches the internal combustion engine between operating in a partial cylinder operation mode in which only one of the first cylinder group and the second cylinder group is operated, and operating in a full cylinder operation mode in which both the first cylinder group and the second cylinder group are operated, as well as selectively starts and stops operation of the supercharger depending on a load on the internal combustion engine when the internal combustion engine is to be operated in the partial cylinder operation mode, wherein:

the controller operates only the first cylinder group when the internal combustion engine is to be operated in the partial cylinder operation mode with supercharging; and the controller operates only the second cylinder group when the internal combustion engine is to be operated in the partial cylinder operation mode with natural aspiration, wherein when the controller switches from operating the internal combustion engine in the partial cylinder operation mode with natural aspiration to operating the internal combustion engine in the partial cylinder operation mode with supercharging, the controller first switches to the full cylinder operation mode while starting the supercharger, and then switches to the partial cylinder operation mode with supercharging.

* * * * *